(12) United States Patent
Lu et al.

(10) Patent No.: US 8,060,673 B2
(45) Date of Patent: Nov. 15, 2011

(54) SMART CARD READ/WRITE CONTROL METHOD BASED ON USB INTERFACE AND READER/WRITER THEREOF

(75) Inventors: Zhou Lu, Beijing (CN); Hua Zhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 307 days.

(21) Appl. No.: 11/564,469

(22) Filed: Nov. 29, 2006

(65) Prior Publication Data

US 2007/0228164 A1 Oct. 4, 2007

(30) Foreign Application Priority Data

Mar. 31, 2006 (CN) .......................... 2006 1 0066862

(51) Int. Cl.
G06F 13/12 (2006.01)
G06F 13/38 (2006.01)
G06F 3/00 (2006.01)
H04B 1/38 (2006.01)
H04L 5/16 (2006.01)

(52) U.S. Cl. .................... 710/72; 710/5; 710/8; 710/11; 375/219

(58) Field of Classification Search .................. 710/5, 8, 710/11, 72; 375/219
See application file for complete search history.

(56) References Cited

U.S. PATENT DOCUMENTS

| | | | |
|---|---|---|---|
| 6,522,552 B1 * | 2/2003 | Lee | 361/752 |
| 7,436,300 B2 * | 10/2008 | Glass et al. | 340/568.1 |
| 2006/0031752 A1 * | 2/2006 | Surloff et al. | 715/501.1 |
| 2006/0053244 A1 * | 3/2006 | Fruhauf et al. | 710/313 |
| 2006/0149963 A1 * | 7/2006 | Lu et al. | 713/151 |
| 2007/0175994 A1 * | 8/2007 | Fruhauf | 235/440 |
| 2009/0073965 A1 * | 3/2009 | Dowling et al. | 370/352 |

FOREIGN PATENT DOCUMENTS

| | | |
|---|---|---|
| CN | 2618212 Y | 5/2004 |
| CN | 1532659 | 9/2004 |

OTHER PUBLICATIONS

Rankl et al, "Smart Card Handbook" Third Editiion, Jan. 16, 2004.*
Rankl, "Smart Card Handbook", 2003, Third Edition, pp. 93-94, 153, 423-425.*
USB Device Class Definition for Human Interface Devices (HID), Firmware Specification Jun. 27, 2001, Version 1.11, 97 pages.

(Continued)

*Primary Examiner* — Alford Kindred
*Assistant Examiner* — Farley Abad
(74) *Attorney, Agent, or Firm* — Workman Nydegger

(57) ABSTRACT

The present invention uses a smart control module with HID descriptors to communicate with the host side in accordance with the standard HID communication protocol, so as to interact with the smart card, which can eliminate the need of installing a private driver from a particular manufacturer when installing its reader/writer. The driver of the HID device can be installed automatically upon installation of the operating system. The users can use the reader/writer easily without carrying a driver around. It is not necessary for the users to deal with upgraded versions of the driver, to consider compatibilities of drivers for different products, to confront usage risks of the operating system due to the driver, or to worry about contamination of the operating system resulted from the installation and uninstallation of the driver.

10 Claims, 2 Drawing Sheets

OTHER PUBLICATIONS

Interoperability Specification for ICCs and Personal Computer Systems, Part 1, *Introduction and Architecture Overview*, Bull CP8 et al., Revision 1.0, Dec. 1997, 29 pages.

Interoperability Specification for ICCs and Personal Computer Systems, Part 2, *Interface Requirements for Compatible IC Cards and Readers*, Bull CP8 et al., Revision 1.0, Dec. 1997, 30 pages.

Interoperability Specification for ICCs and Personal Computer Systems, Part 3, *Requirements for PC-Connected Interface Devices*, Bull CP8 et al., Revision 1.0, Dec. 1997, 31 pages.

Interoperability Specification for ICCs and Personal Computer Systems, Part 4, *IFD Design Considerations and Reference Design Information*, Bull CP8 et al., Version 1.0, Dec. 1997, 31 pages.

Interoperability Specification for ICCs and Personal Computer Systems, Part 5, *ICC Resource Manager Definition*, Bull CP8 et al., Revision 1.0, Dec. 1997, 30 pages.

Interoperability Specification for ICCs and Personal Computer Systems, Part 6, *ICC Service Provider Interface Definition*, Bull CP8 et al., Revision 1.0, Dec. 1997, 41 pages.

Interoperability Specification for ICCs and Personal Computer Systems, Part 7, *Application Domain and Developer Design Considerations*, Bull CP8 et al., Revision 1.0, Dec. 1997, 17 pages.

Interoperability Specification for ICCs and Personal Computer Systems, Part 8, *Recommendations for ICC Security and Privacy Devices*, Bull CP8 et al., Revision 1.0, Dec. 1997, 42 pages.

* cited by examiner

US 8,060,673 B2

SMART CARD READ/WRITE CONTROL METHOD BASED ON USB INTERFACE AND READER/WRITER THEREOF

FIELD OF THE INVENTION

The present invention relates to a smart card read/write control method and the reader thereof, and more particularly, to a smart card read/write control method based on a USB interface and a reader/writer thereof.

BACKGROUND OF THE INVENTION

As the smart card technologies have been popularized, more and more smart cards have been widely applied in daily transactions such as the SIM card, the banking card and the like.

Most of the current smart cards generally read/write data using a reader/writer, which is usually equipped with a USB interface. To enable the conversion of the USB communication protocol to the smart card protocol for the reader/writer and to make the host interface compliant with the smart card specification, the manufacturers often adopt a private communication protocol when designing the USB communication protocol. Therefore, it is required to install a private driver from the particular manufacturer for the reader/writer to function. This is known as a so-called driver reader/writer. However, it is so inconvenient that the users who want to use or upgrade the reader/writer must deal with the driver.

SUMMARY OF THE INVENTION

In view of the above, the embodiments of the present invention provide a smart card read/write control method based on a USB human interface and a reader/writer thereof, which can be simple in operation and structure.

To this end, one aspect of the present invention provides a smart card read/write control method based on a USB interface, wherein the method may include the steps of:

a host establishing a connection with the smart card reader/writer by enumerating a USB Human Interface Device (HID), gaining human interface class and report descriptors, and setting up communications with the smart card reader/writer;

the host sending commands to the smart card reader/writer via the USB interface with a standard HID protocol;

the smart card reader/writer resolving and processing the control commands, including data interaction with the smart card according to the commands; and the smart card reader/writer converting a processing result to be returned into data compliant with the HID protocol, and sending the data back to the host.

Optionally, the Human Interface Device (HID) commands may be SET FEATURE and GET FEATURE.

Optionally, the control commands may include identity authentication, privilege management and/or read/write operations.

Another aspect of the present invention provides a smart card reader/writer which may include a smart processor module with built-in Human Interface Device (HID) descriptors, and a USB interface and a smart card module connected respectively with the smart processor module.

Optionally, the smart processor module may include a smart control unit, and a USB communication protocol unit, a program memory unit and an Input/Output (I/O) unit connected respectively with the smart control unit, the USB communication protocol unit being connected with the USB interface, and the I/O unit being connected with the smart card module.

Optionally, the smart card module may be a contact smart card connection unit.

Optionally, the smart processor module may further include a smart card insertion detection unit connected with the smart control unit and with the smart card module.

Optionally, the smart card module may be a contactless card control module comprising a modulating and transmitting unit and a receiving and demodulating unit.

The embodiments of the present invention use the smart control module with HID descriptors to communicate with the host side in accordance with the standard HID communication protocol, so as to interact with the smart card, which can eliminate the need of installing a private driver from a particular manufacturer when installing its reader/writer. The driver of the HID device can be installed automatically upon installation of the operating system. The users can use the reader/writer easily without carrying the driver around. Thus, it is not necessary for the users to deal with upgraded versions of the driver, to consider compatibilities of drivers for different products, to confront usage risks of the operating system due to the driver, or to worry about contamination of the operating system resulted from the installation and uninstallation of the driver.

BRIEF DESCRIPTION OF THE DRAWINGS

The present invention may be further understood from the following description in conjunction with the appended drawings in which.

DETAILED DESCRIPTION OF THE EMBODIMENTS

It is not required to install in operating systems of Windows 98 SE or higher a driver for a USB terminal HID device, so it is very convenient for the users. The present invention will be further described below in combination with the particular embodiments. In an embodiment, HID as used herein indicates revision 1.11 of the HID Protocol dated Jun. 27, 2001, but embodiments are not so limited. All revisions may be made to the Protocol without changing the scope of the claimed invention.

Figure 1:
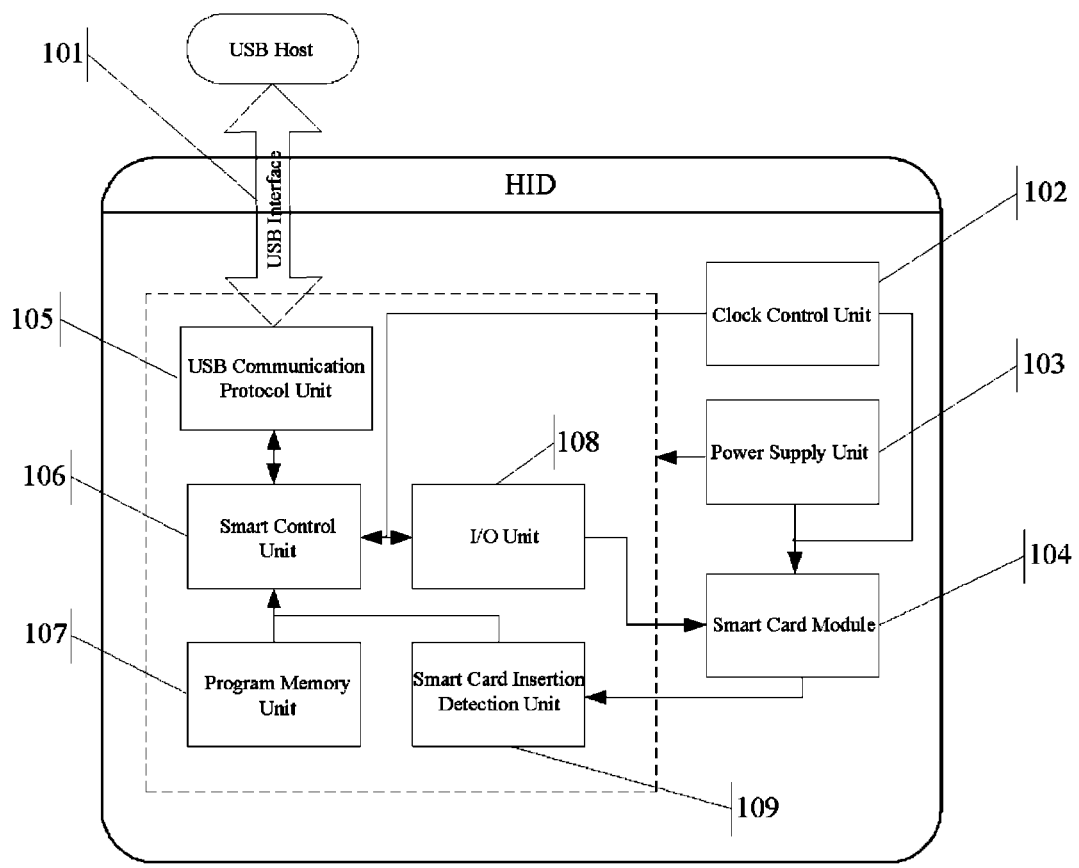
FIG. 1 is a block diagram of one embodiment of the present invention.

Referring to FIG. 1, it is shown a contact smart card reader/writer which includes a smart processor module, and a USB interface 101 and a smart card module 104 that are connected to the smart processor module respectively. The smart card module is a contact smart card connection unit, and in this embodiment, a contact smart card base. The smart processor module includes a smart control unit 106 with built-in HID descriptors, and a USB communication protocol unit 105, a program memory unit 107 and an I/O unit 108 that are connected to the smart control unit. The USB communication protocol unit 105 is connected to the USB interface. The I/O unit 108 is connected to the smart card module 104. The smart processor module also includes a smart card insertion detection unit 109 connected to the smart control unit 106 and also to the smart card module 104, for detecting whether the card has been inserted. The USB communication protocol unit 105, the smart control unit 106, the program memory unit 107, the I/O unit 108 and the smart card insertion detection unit 109 can be integrated into a generic microprocessor chip which can convert the USB communication protocols, have more than four I/O interfaces, and function directly with a USB power supply. An internal power can be generated by a power supply unit 103. A clock signal can be generated by a clock control unit 102 with frequency division, or generated by a timer inside the smart control unit 106.

The read/write control method with the USB HID reader/writer in this embodiment is described as follows:

1. The host recognizes the device: the host establishes a connection with the smart card reader/writer by enumerating a USB HID device, gains the HID class and report descriptors, and sets up communications with the reader/writer.

2. After enumerating the device, the host uses commands such as SET FEATURE and GET FEATURE to communicate with the reader/writer for data transmission and reception in accordance with the convention of the HID report descriptors.

3. The device resolves and processes the commands, and interacts with the smart card according to the commands. Most of the data interaction between the reader/writer and the host essentially uses subclasses such as SET FEATURE and GET FEATURE in the HID protocol for the USB Specification. The host sends or receives a USB data packet with a fixed length of bytes to or from the reader/writer each time. The interaction is always initiated by the USB host due to the host/slave feature as defined in the USB Specification. The host can organize the contents of the USB data packet for the purpose of the communications and send the packet to the reader/writer with a conventional format. The reader/writer can resolve the data according to the commands, and interact with the smart card.

Particularly, the host first initiates a data transfer, for example, using the SET FEATURE child protocol of the HID protocol to transfer a data packet in the form of the HID protocol to the smart control module. The packet is made up of one or more SET FEATURE transactions. After the smart control module has received the packet, it can resolve the packet with the HID protocol, and distinguish the portion of the data to be sent to the smart card from the portion of the data to be operated by the control module itself. Upon receipt of the data to be sent to the smart card, the smart control module converts the data to Application Protocol Data Units (APDUs) in compliance with the ISO 7816 standard for the contact card, and sends the units to the smart card according to the corresponding protocol. In an embodiment, the ISO 7816 standard as used herein indicates ISO 7816-1 standard amended in 2003, ISO 7816-2 standard amended in 2004, ISO 7816-3 standard amended in 2002, ISO 7816-4 standard updated in 2005, ISO 7816-5 standard updated in 2004, ISO 7816-6 standard updated in 2004, ISO 7816-7 standard created (or updated) in 1999, ISO 7816-8 standard updated in 2004, ISO 7816-9 standard updated in 2004, ISO 7816-10 standard created (or updated) in 1999, ISO 7816-11 standard created (or updated) in 2004, ISO 7816-12 standard created in 2005, and ISO 7816-15 standard created in 2004, but embodiments are not so limited. All revisions may be made to the Protocol without changing the scope of the claimed invention. Meanwhile, the module also processes the data returned from the smart card in accordance with the smart card communication protocol so as to communicate with the smart card.

Once the smart control module has received the command GET FEATURE, it converts the data received from the smart card to the data compliant with the HID format and forwards the data to the host. By parsing the contents of the returned data, the host determines whether the transfer has been completed and whether more than one SET FEATURE and GET FEATURE commands are required so as to complete a valid data communication process for the packets. Thus, a complete data communication process is finished.

4. The reader/writer returns the information returned by the smart card. The data from the smart card is converted to the data compliant with the HID protocol and sent to the host.

During the entire process of the protocol conversion, the smart card reader/writer provides the host with a protocol conversion module adapted to parse the smart card protocol and to convert the smart card data on the host side into HID data. Also, the reader/writer provides the users with an interface simulating PC/SC (Personal Computer/Smart Card). The function interface provided for the users is with full compliance with the PC/SC Specification and is easy to be called by the users. In an embodiment, PC/SC Specification as used herein indicates revision 2.01.3 of the PC/SC Specification dated January, 2006, but embodiments are not so limited. All revisions may be made to the Specification without changing the scope of the claimed invention.

Figure 2:
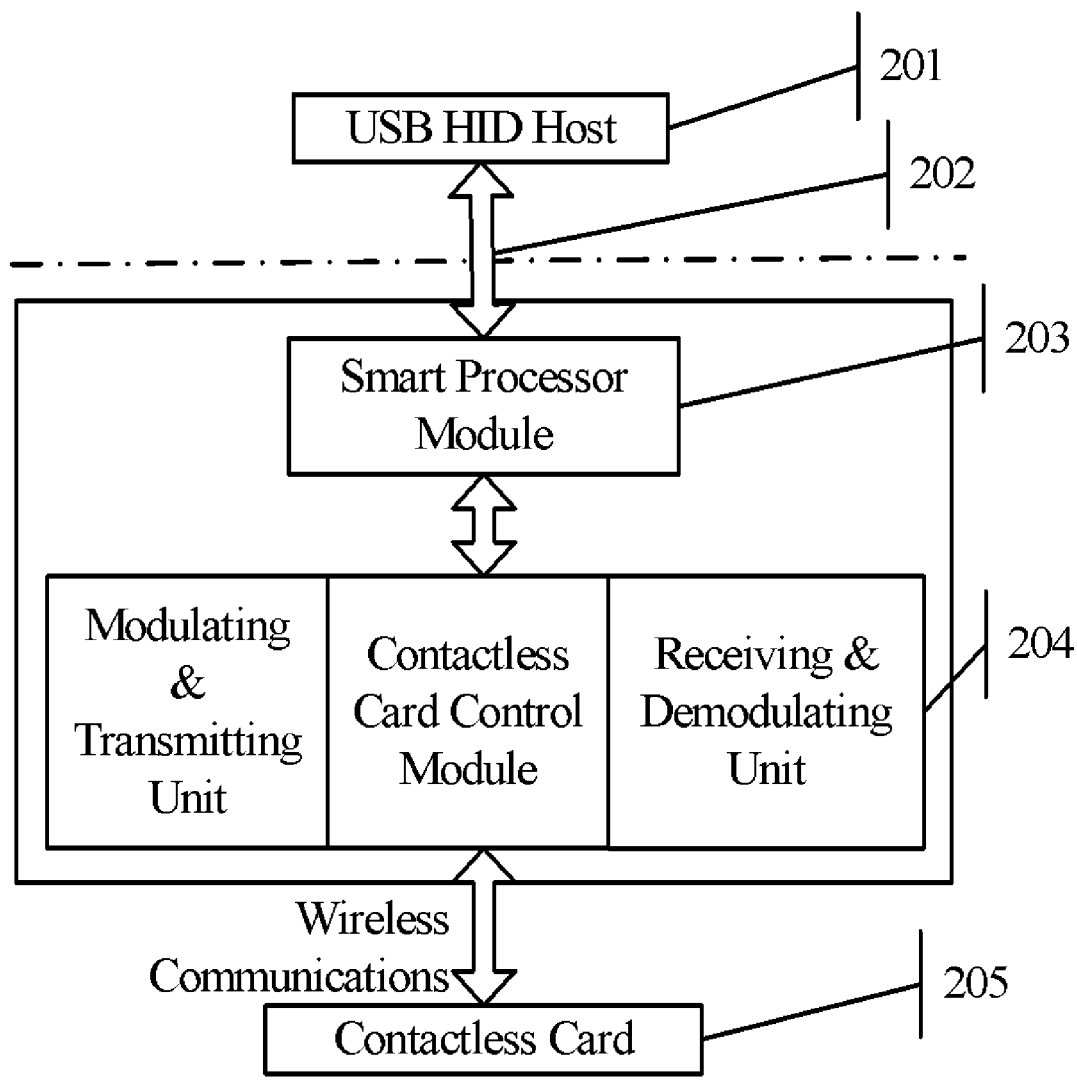
FIG. 2 is a block diagram of another embodiment of the present invention.

Referring to FIG. 2, this is a block diagram of another embodiment according to the present invention, which includes a smart processor module 203 with built-in HID descriptors, and a USB interface 202 and a smart card module 204 that are connected to the smart processor module respectively. The smart card module 204 is a contactless card control module including a modulating and transmitting unit and a receiving and demodulating unit. The smart processor module 203 serves to parse the host HID protocol and to convert the protocol to the contactless card data protocol. The smart card module 204 is used to convert the electrical signal to the contactless signal, primarily to convert the data sent by the smart processor module 203 into the wireless signal by modulating and transmitting and to send the wireless signal to a contactless card 205, as well as to convert the wireless signal from the contactless card 205 into the electrical signal by receiving and demodulating and to send the electrical signal to the smart processor module 203, which in turn converts the signal according to the HID protocol and sends the result to the host 201.

The communication between the contactless card 205 and the smart card module 204 follows the short-range card communication protocol of ISO/IEC 14443 Specification or the remote card communication protocol of ISO/IEC 15693 Specification. In an embodiment, ISO/IEC 14443 Specification as used herein indicates ISO/IEC 14443-1:2000, ISO/IEC 14443-2:2001, ISO/IEC 14443-2-am1 Ed. 1.0 dated Jun. 2, 2005, ISO/IEC 14443-3 (2001-02), ISO/IEC 14443-3-am1 (2005-06) and ISO/IEC 14443-4:2001; ISO/IEC 15693 Specification as used herein indicates ISO/IEC 15693-1:2000, ISO/IEC 15693-2:2000, ISO/IEC 15693-2:2000/Cor.1:2001, ISO/IEC 15693-3:2001, but embodiments are not so limited. All revisions may be made to the Specification without changing the scope of the claimed invention. The smart processor module includes a smart control unit, and a USB communication protocol unit, a program memory unit and an I/O unit that are connected to the smart control unit respectively. The USB communication protocol unit is connected to the USB interface. The I/O unit is connected to the contactless card control module. The connections within the smart control unit are the same as those in the previous embodiment, and therefore, the descriptions thereof will not be repeated here.

The read/write method of the USB HID reader/writer of this embodiment is substantially the same as that of the previous embodiment except the communication protocol between the smart control module and the smart card as particularly described hereinafter.

According to the convention by the HID protocol of the USB Specification, each data transfer is performed through the SETUP transactions. The USB host initiates a data transfer and use the SET FEATURE child protocol of the HID protocol to send a data packet compliant with the HID protocol to the smart processor module. This packet is made up of one or more SET FEATURE transactions. After the smart processor module has received the packet, it resolves the packet in accordance with the HID protocol. If the data needs to be sent to the contactless card, then the smart processor module starts the modulating and transmitting unit in the smart card module so as to establish communication with the smart card, and also sends the data to the card according to the requirements of ISO/IEC 14443 Specification or ISO/IEC 15693 Specification, and starts the receiving and demodulating unit to process the returned data, so as to complete the communication with the smart card. The smart processor module converts the data from the card into the data compliant with the HID protocol, and transfers the data to the host once it has received the command GET FEATURE from the host. The above is a communication process of the contactless card.

The smart card reader/writer according to the embodiments of the present invention communicates with the host with the standard HID protocol, which eliminates the need of installing a private driver from a particular manufacturer when installing its reader/writer. A driver provided by the operating system can be installed automatically. The users can use the reader/writer anytime and anywhere without carrying the driver around. The installation of a driver is not required when the users are going to use a PC peripheral device. In addition, it is not necessary for the users to deal with the upgraded versions of the driver, to consider the compatibilities of drivers for different products, to confront the usage risks of the operating system due to the driver, or to worry about the contamination of the operating system resulted from the install and uninstall of the driver, which can benefit the users, especially those who are not very skilled in computer related operations.

While the smart card read/write method based on the USB interface and the reader/writer thereof according to the embodiments of the present invention have been described in details above, it will be appreciated by those ordinarily skilled in the art that the present invention can be embodied in other specific forms without departing from the spirit or scope thereof. The presently disclosed embodiments are therefore considered in any respects to be illustrative but not restrictive. The scope of the invention is defined by the appended claims rather than the foregoing description, and all changes which fall within the meaning and range of equivalents thereof are intended to be embraced therein.

What is claimed is:

1. A smart card read/write control method based on a Universal Serial Bus (USB) interface, comprising the steps of:
   a host establishing a connection with the smart card reader/writer by enumerating a USB Human Interface Device (HID), gaining human interface class and report descriptors, and setting up communications with the smart card reader/writer;
   the host sending a HID control command to the smart card reader/writer via the USB interface with a standard HID protocol;
   the smart card reader/writer resolving and processing the HID control command initiated by the host, and interacting data in HID protocol with the host according to the HID control command; wherein during resolving and processing the HID control command, the smart card reader/writer provides an interface simulating Personal Computer/Smart Card (PC/SC)specification;
   wherein, if the HID control command initiated by the host is a SET FEATURE, the step of the host sending a HID control command to the smart card reader/writer via the USB interface with a standard HID protocol comprises;
   the host initiating a data transfer using a SET FEATURE child protocol of HID protocol to transfer a data packet in the form of HID protocol to the smart card reader/writer, wherein the data packet is made up of one or more SET FEATURE transactions;
   wherein the step of the smart card reader/writer resolving and processing the HID control command initiated by the host, and interacting data in HID protocol with the host according to the HID control command comprises:
   if the HID control command initiated by the host is a SET FEATURE, the smart card reader/writer obtaining HID protocol data from the host, distinguishing the portion of HID protocol data to be sent to the smart card from the portion of data to be operated by the smart card reader/writer itself, and converting the HID protocol data to be sent to the smart card to Application Protocol Data Units (APDUs) in compliance with ISO 7816 standard for a contact card or to APDUs in compliance with ISO/IEC 14443 Specification or ISO/IEC 15693 Specification for a contactless card and sending the APDUs to the smart card; and
   if the HID control command initiated by the host is a GET FEATURE, the smart card reader/writer obtaining APDUs from the smart card and converting the APDUs to HID protocol data and sending the HID protocol data to the host;
   wherein the HID protocol data is the data with a fixed length of bytes.

2. The method according to claim 1, wherein the HID control command further comprise identity authentication and/or privilege management.

3. A smart card reader/writer using the control method according to claim 1, comprising a smart processor module with built-in Human Interface Device (HID) descriptors, and a USB interface and a smart card module for processing or reading/writing information within a smart card, which are connected respectively with the smart processor module, the smart processor module is adapted to convert data from the smart card into data compliant with the HID protocol, and to transfer the data to a host once it has received a HID control command of request for data from the host, wherein if the HID control command initiated by the host is a SET FEATURE, the host initiates a data transfer using a SET FEATURE child protocol of HID protocol to transfer a data packet in the form of HID protocol to the smart card reader/writer, wherein the data packet is made up of one or more SET FEATURE transactions; wherein the smart processor module is also connected with an interface simulating Personal Computer/Smart Card (PC/SC) specification, wherein the smart card module is a contact smart card connection unit or a contactless card control module comprising a modulating and transmitting unit and a receiving and demodulating unit, and when the HID control command is SET FEATURE, the smart card module is adapted to distinguish the portion of HID protocol data to be sent to the smart card from the portion of data to be operated by the smart card module itself after receiving HID protocol data from the host, and convert the data to be sent to the smart card to Application Protocol Data Units (APDUs) in compliance with ISO 7816 standard for a contact card or to APDUs in compliance with ISO/IEC 14443

Specification or ISO/IEC 15693 Specification for a contactless card, and when the HID control command is GET FEATURE, the smart card module is adapted to convert APDUs from the smart card to HID protocol data and sending the HID protocol data to the host; wherein the HID protocol data is data with a fixed length of bytes.

4. The smart card reader/writer according to claim 3, wherein the smart processor module comprises a smart control unit, and a USB communication protocol unit, a program memory unit and an Input/Output (I/O) unit that are connected respectively with the smart control unit, the USB communication protocol unit being connected with the USB interface, and the I/O unit being connected with the smart card module.

5. The smart card reader/writer according to claim 4, wherein the smart processor module further comprises a smart card insertion detection unit connected with the smart control unit and with the smart card module.

6. The smart card reader/writer according to claim 4, wherein a clock signal is generated by a clock control unit with frequency division, or generated by a timer inside the smart control unit.

7. The smart card reader/writer according to claim 4, wherein the contact smart card connection unit is a contact smart card base.

8. The smart card reader/writer according to claim 3, wherein a communication process between a contactless card and the smart card module follows the short-range card communication protocol of ISO/IEC 14443 Specification or the remote card communication protocol of ISO/IEC 15693 Specification.

9. The smart card reader/writer according to claim 8, wherein the smart processor module parses the data received from the host, if the data is to be sent to the contactless card, the smart processor module starts the modulating and transmitting unit in the smart card module so as to establish communication with the smart card.

10. The method according to claim 1, wherein the smart card reader/writer provides the host with a protocol conversion module adapted to parse the smart card protocol and to convert the smart card data on the host side into HID data.

\* \* \* \* \*